(12) United States Patent
Venkataraghavan et al.

(10) Patent No.: US 12,113,634 B2
(45) Date of Patent: Oct. 8, 2024

(54) SYSTEM, METHOD, AND COMPUTER PROGRAM TO DYNAMICALLY ADAPT OVER-THE-TOP (OTT) CALL ROUTING

(71) Applicant: RAKUTEN MOBILE, INC., Tokyo (JP)

(72) Inventors: Krishnan Venkataraghavan, Tokyo (JP); Hiroshi Takeshita, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 109 days.

(21) Appl. No.: 17/546,150

(22) Filed: Dec. 9, 2021

(65) Prior Publication Data

US 2023/0188370 A1  Jun. 15, 2023

(51) Int. Cl.
*H04L 41/5019* (2022.01)
*H04L 12/14* (2006.01)
*H04M 15/00* (2006.01)
*H04W 40/12* (2009.01)

(52) U.S. Cl.
CPC ...... *H04L 12/1407* (2013.01); *H04L 41/5019* (2013.01); *H04M 15/66* (2013.01); *H04W 40/12* (2013.01)

(58) Field of Classification Search
CPC ............ H04L 12/1407; H04L 41/5019; H04M 15/66; H04W 40/12
USPC ....................................................... 709/224
See application file for complete search history.

(56) References Cited

U.S. PATENT DOCUMENTS

| 2010/0188990 A1* | 7/2010 | Raleigh ................. H04M 15/00 709/224 |
| 2014/0068064 A1* | 3/2014 | Anchan ................ H04L 47/805 709/224 |
| 2016/0219644 A1* | 7/2016 | Zhao ..................... H04W 76/12 |

OTHER PUBLICATIONS

International Search Report dated May 3, 2022 in Application No. PCT/US2022/016071.
Written Opinion of the International Searching Authority dated May 3, 2022 in Application No. PCT/US2022/016071.

* cited by examiner

*Primary Examiner* — Vivek V Srivastava
*Assistant Examiner* — Hien V Doan
(74) *Attorney, Agent, or Firm* — Sughrue Mion, PLLC (57) ABSTRACT

A method for setting a policy for Over-The-Top (OTT) calls in a mobile network is provided. The method includes determining whether a cell of the mobile network has at least one neighboring cell of at least one roaming partner of the mobile network, and determining a bearer policy for routing OTT calls in the cell based on whether the cell is determined to have the at least one neighboring cell of the at least one roaming partner. The determined bearer policy indicates whether the OTT calls in the cell are to be routed on a dedicated bearer or a default bearer for connecting to an Internet Access Point Name (APN).

17 Claims, 5 Drawing Sheets

SYSTEM, METHOD, AND COMPUTER PROGRAM TO DYNAMICALLY ADAPT OVER-THE-TOP (OTT) CALL ROUTING

BACKGROUND

1. Field

The disclosure relates generally to roaming interoperability for over-the-top (OTT) call routing.

2. Description of Related Art

Roaming partners have specific policies to admit or reject bearers depending on the packet data network (PDN) to which the bearers correspond. One of the policies of the roaming operator may be to reject any bearers on the Internet access point name (APN) apart from default bearers. Thus, existing sessions (e.g., Over-The-Top (OTT) application calls or sessions) routed on a home operator's non-default Internet APN bearer (e.g., a dedicated Internet APN bearer) may have issues when transitioning (or handing over) from a home operator touchpoint or cell to a roaming operator touchpoint or cell. Specifically, the roaming operator may reject the dedicated bearer resulting in issues such as call muting and session disconnection. As a result, user perception is poor while moving between the home and roaming operators.

SUMMARY

One or more example embodiments provide a system and method for dynamically adapting bearers to enhance inter action with roaming touch points and to enhance voice quality of Over-The-Top (OTT) applications during transitions between home and roaming operator touch points.

According to an aspect of the disclosure, a method for setting a policy for OTT calls in a mobile network is provided. The method may include determining whether a cell of the mobile network has at least one neighboring cell of at least one roaming partner of the mobile network, and determining a bearer policy for routing OTT calls in the cell based on whether the cell is determined to have the at least one neighboring cell of the at least one roaming partner. The determined bearer policy may indicate whether the OTT calls in the cell are to be routed on a dedicated bearer or a default bearer for connecting to an Internet Access Point Name (APN)

According to an aspect of the disclosure, a system for setting a policy for OTT calls in a mobile network is provided. The system may include a memory storing instructions and a processor configured to execute the instructions to determine whether a cell of the mobile network has at least one neighboring cell of at least one roaming partner of the mobile network, and determine a bearer policy for routing OTT calls in the cell based on whether the cell is determined to have the at least one neighboring cell of the at least one roaming partner. The determined bearer policy may indicate whether the OTT calls in the cell are to be routed on a dedicated bearer or a default bearer for connecting to an Internet APN.

According to an aspect of the disclosure, a non-transitory computer-readable storage medium for setting a policy for OTT calls in a mobile network is provided. The storage medium may be connected to one or more processors and may be configured to store instructions that, when executed, cause the one or more processors to determine whether a cell of the mobile network has at least one neighboring cell of at least one roaming partner of the mobile network, and determine a bearer policy for routing OTT calls in the cell based on whether the cell is determined to have the at least one neighboring cell of the at least one roaming partner. The determined bearer policy may indicate whether the OTT calls in the cell are to be routed on a dedicated bearer or a default bearer for connecting to an Internet APN.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
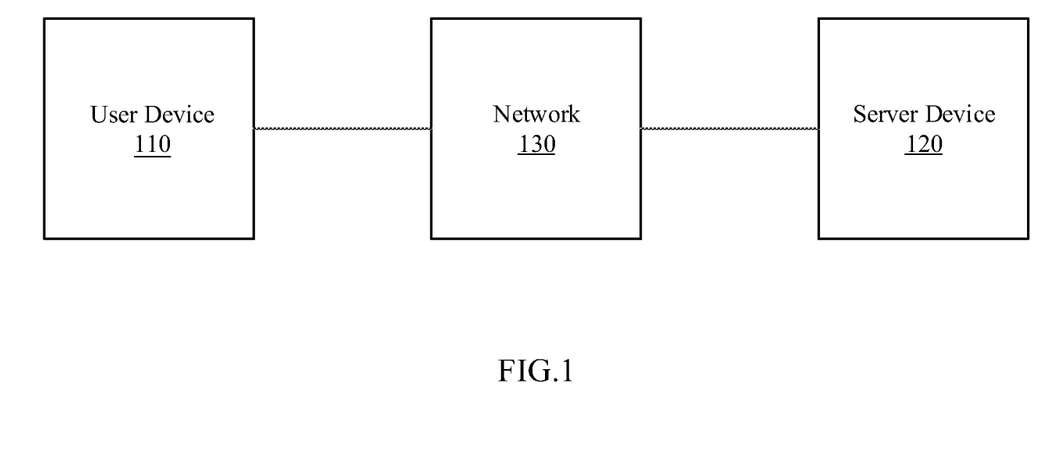
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 may include one or more devices. For example, the server device 120 may be a server device, a computing device, or the like.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
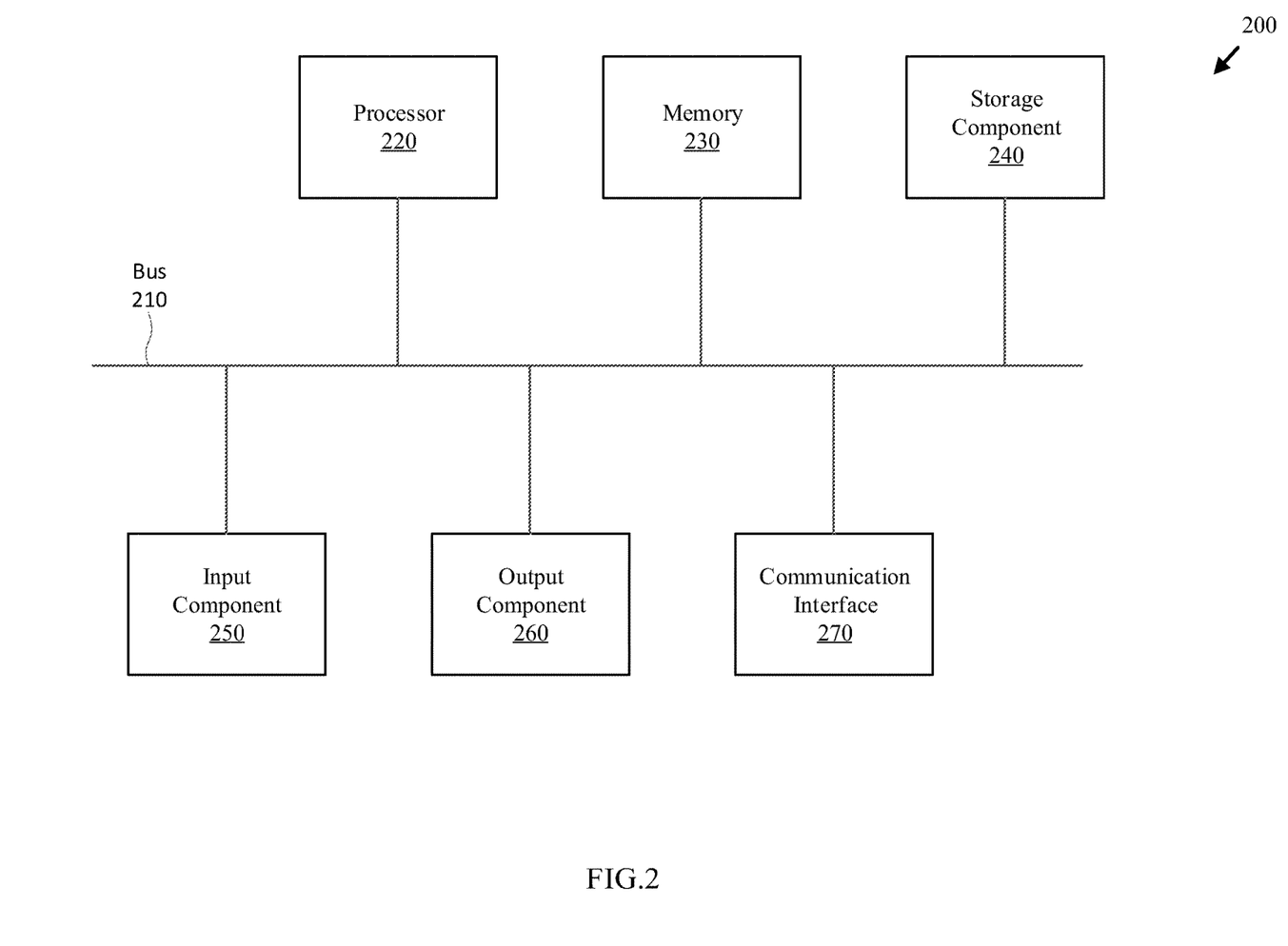
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 220 may include one or more processors capable of being programmed to perform a function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

On a home operator, an OTT session may be established by a user equipment (UE) or terminal (e.g., the device 110 of FIG. 1) according to a policy defined by the home operator (e.g., a server of or accessible by the home operator, such as the server 120 of FIG. 1), where calls may be routed on any dedicated or default bearer riding on an Internet APN depending on policy. Thus, such calls or sessions routed on a dedicated bearer pursuant to the home operator policy may be dropped during a handover to the roaming operator during an active session due to a policy on the roaming operator core (e.g., a mobility management entity (MME)), for example, to reject any bearer other than the default bearer established on the Internet APN.

In order to prevent dropped calls and sessions, the system may determine sites (e.g., cells) that have one or more roaming touch points and sites that have only non-roaming touch points from neighbor tables (e.g., determining neighbor cells and whether the neighbor cells are roaming partners). The system may dynamically route calls according to a home operator policy while on non-roaming touch points. The system may reroute calls to default bearers on the Internet APN on sites of a home PLMN that are determined to include roaming touch points. The system may handover OTT sessions from sites of a home operator with roaming touch points to sites of a roaming operator on the default bearer established on the Internet APN. The system may also initiate trigger suppression of OTT calls originating from a roaming partner area.

Figure 3:
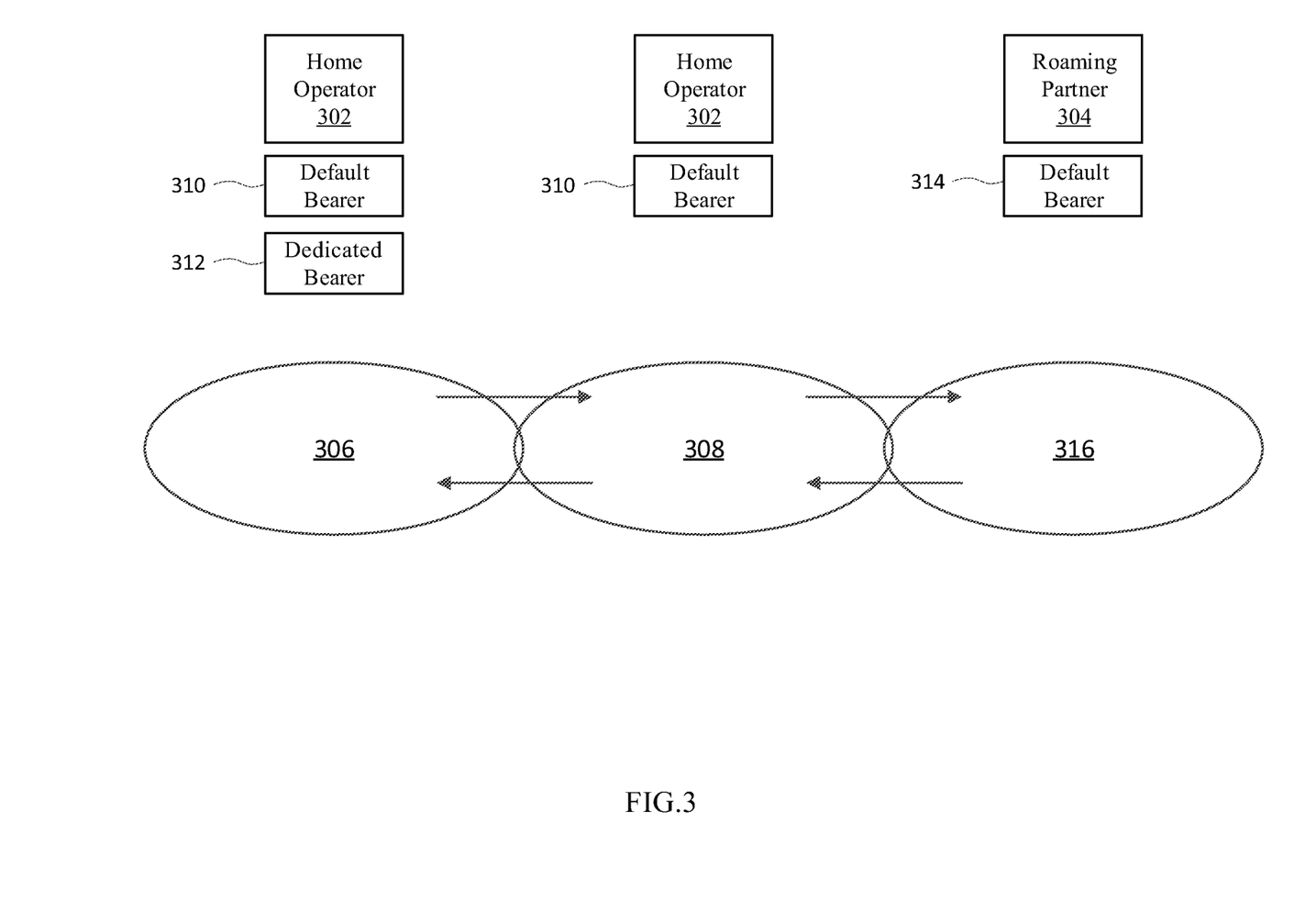
FIG. 3 is a diagram of a network, according to an embodiment.

FIG. 3 is a diagram of a network, according to an embodiment. The network may include a home operator 302 and a roaming partner 304. The home operator 302 may have a corresponding home operator non-roaming area 306 and a home operator roaming border 308. In the home operator non-roaming area 306 (i.e., an area determined to not have roaming touch points according to, for example, information maintained and updated in an external node or server 120 of or accessible by the home operator 302), the home operator 302 may operate with a default bearer (Internet APN) 310 and a dedicated bearer (Internet APN) 312. In the home operator roaming border 308, the home operator 302 may operate with the default bearer 310. The roaming partner 304 may operate with the default bearer (Internet APN) 314. The roaming partner 304 may include an area 316 located in proximity to the home operator roaming boarder 308. A system and method for OTT call routing in the network shown in FIG. 3 is described below.

Figure 4:
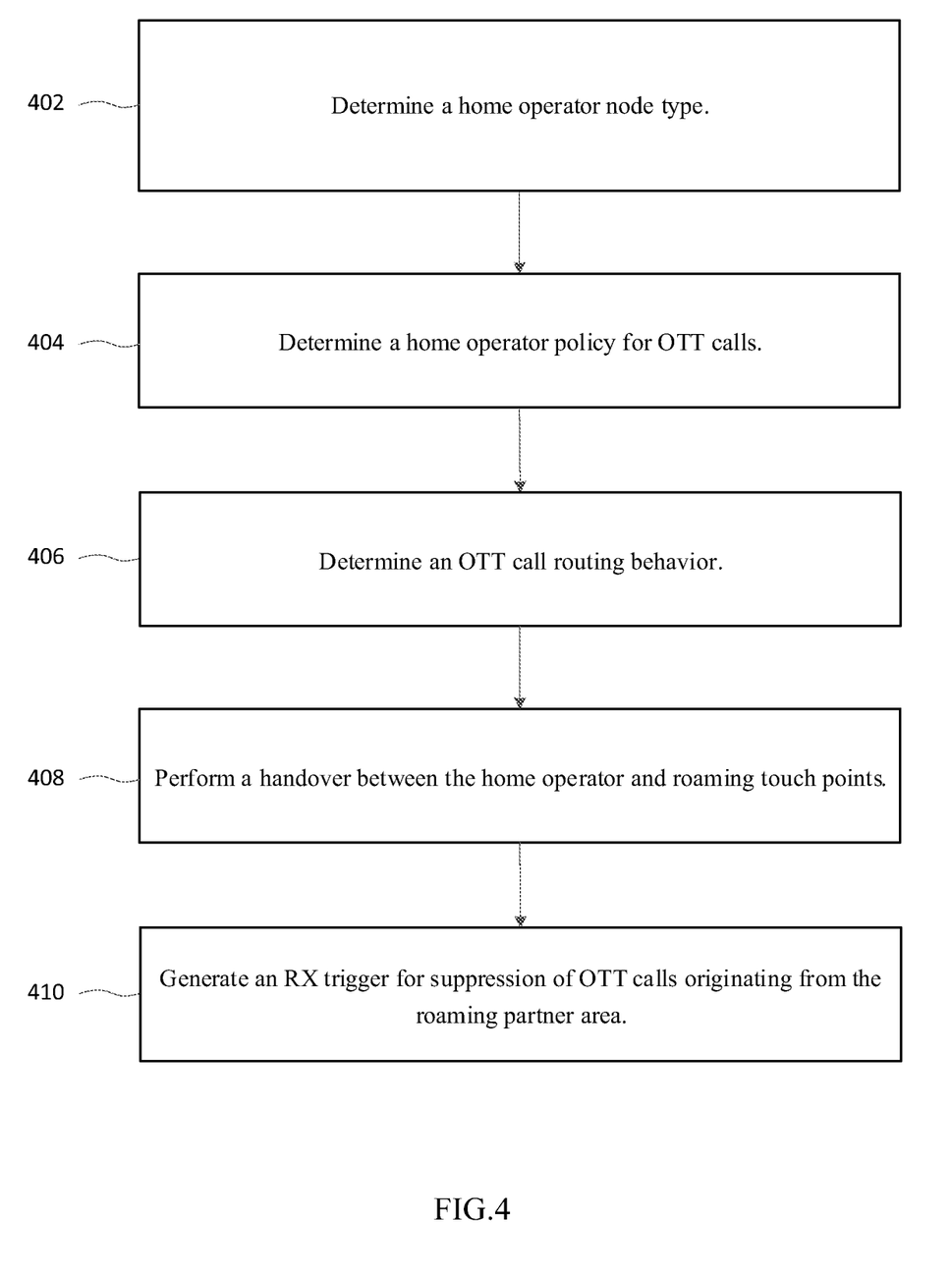
FIG. 4 is a flowchart for a method of over-the-top (OTT) call routing according to an embodiment.

FIG. 4 is a flowchart for a method of OTT call routing according to an embodiment. In operation 402, the system (e.g., external node or server 120 accessible by the home operator) determines a home operator node type. For example, an external node or server 120 may determine, from existing neighbor tables of home operator sites, whether at least one neighbor cell of a current site (i.e., a home operator site for which the policy is being determined pursuant to operations 402 and 404) belongs to a roaming PLMN. Based on at least one neighbor cell belonging to the roaming PLMN, the system (e.g., server 120) may determine that the site has roaming touch points, and may categorize the site accordingly (e.g., as "having roaming touch points"). When the system determines that none of the neighbor cells of the current site or cell belong to the roaming PLMN, the system may determine that the site or cell does not have roaming touch points and may categorize the site accordingly (e.g., as "not having roaming touch points"). The system may determine (e.g., as set by the operator) the home operator node type periodically, at a predetermined time interval, in response to a request to perform the determination, etc.

In operation 404, the system determines a home operator policy (e.g., a bearer policy) for OTT calls for the current site. The policy of the operator for OTT calls may be obtained from a policy and charging rules function (PCRF) that determines a Quality of Service (QOS) Class Indicator (QCI) (e.g., dedicated or default) to be established based on receiving an RX trigger from the application server corresponding to the OTT application and the corresponding linked bearer on which the same QCI is to be established. For example, an operation may determine to have OTT media on a dedicated bearer of QCI 1 through QCI 4, while having the corresponding signaling on a default bearer of QCI 6 through QCI 9. In this example, QCI 5 is not part of the list as it is a default bearer of an IP multimedia subsystem (IMS) PDN and is used for voice over long term evolution (VOLTE) sessions.

In operation 406, the system determines an OTT call routing behavior. In operation 406, the system may determine whether the OTT calls are to be routed on a dedicated bearer or a default bearer. For example, when the home operator node type is determined to have roaming touch points (i.e., determined to be "having roaming touch points"), the home operator policy for OTT call corresponds to OTT media on a dedicated bearer (e.g., an Internet APN), and the OTT call routing behavior is signaling on the default bearer, the system may receive dedicated bearer details corresponding to the OTT media from the home operator policy for OTT calls (e.g., QCI 3/QCI 4). The system may receive an activation state in a radio access network (RAN) corresponding to the dedicated bearer that corresponds to the home operator policy. When the activation state indicates that the dedicated bearer is enabled for routing OTT calls in the cell, the system may update the activation state from enabled to disabled on the RAN. When the activation state indicates that the dedicated bearer is disabled for routing OTT calls in the cell, the system may determine that no further action is needed.

Meanwhile, when the home operator node type for a current site or cell is determined to not have roaming touch points (e.g., determined to be "not having roaming touch points"), the home operator policy for OTT call corresponds to OTT media on a dedicated bearer (e.g., an Internet APN), and the OTT call routing behavior is signaling on the default bearer, the system may receive dedicated bearer details corresponding to the OTT media from the home operator policy for OTT calls. The system may receive an activation state in a RAN corresponding to the dedicated bearer that corresponds to the home operator policy. When the activation state indicates that the dedicated bearer is disabled for routing OTT calls in the cell, the system may update the activation state from disabled to enabled on the RAN. When the activation state indicates that the dedicated bearer is enabled for routing OTT calls in the cell, the system may determine that no further action is needed.

In a further example, when the home operator node type is determined to either have roaming touch points or to not having roaming touch points, the home operator policy for OTT call corresponds to OTT media on a default bearer (e.g., an Internet APN), and the OTT call routing behavior is signaling on the default bearer, the system may determine that no further action is needed, as the home operator policy for OTT calls is OTT media on the default bearer.

Before a policy change, the system may determine the active calls on the cell and the active calls where a user is between a home operator and a roaming operator. After a policy change, the system may use the existing policy for active calls on the cell at the time of the policy change, and may use the new policy on active calls where the user is between the home operator and the roaming operator. For any subsequent calls, the system may use the new policy.

In operation 408, the system may perform a handover between the home operator and roaming touch points. For example, the system may handover OTT sessions from a home operator node that is categorized as "having roaming touch points" to the roaming partner after operation 406.

In operation 410, the system generates an RX trigger for suppression of OTT calls originating from the roaming partner area. For a new call originating in the roaming partner area or the home network area, the application server of the OTT may initiate an EX-RX trigger towards the PCRF of the home operator. However, this may cause failures on the roaming operator where the policy is not set to activate dedicated bearers on the Internet APN, resulting in call failures. To avoid this, the PCRF may determine if the mobile carrier code (MCC)/mobile network code (MNC) in the RX trigger corresponds to the home PLMN. If the MCC/MNC in the RX trigger corresponds to the home PLMN, the system may proceed with a dedicated bearer establishment. If the MCC/MNC in the RX trigger does not correspond to the home PLMN (e.g., if the call originates from the roaming operator network or Wi-FI), the system may suppress the RX trigger to ensure calls proceed on the default bearer (e.g., Internet APN).

Figure 5:
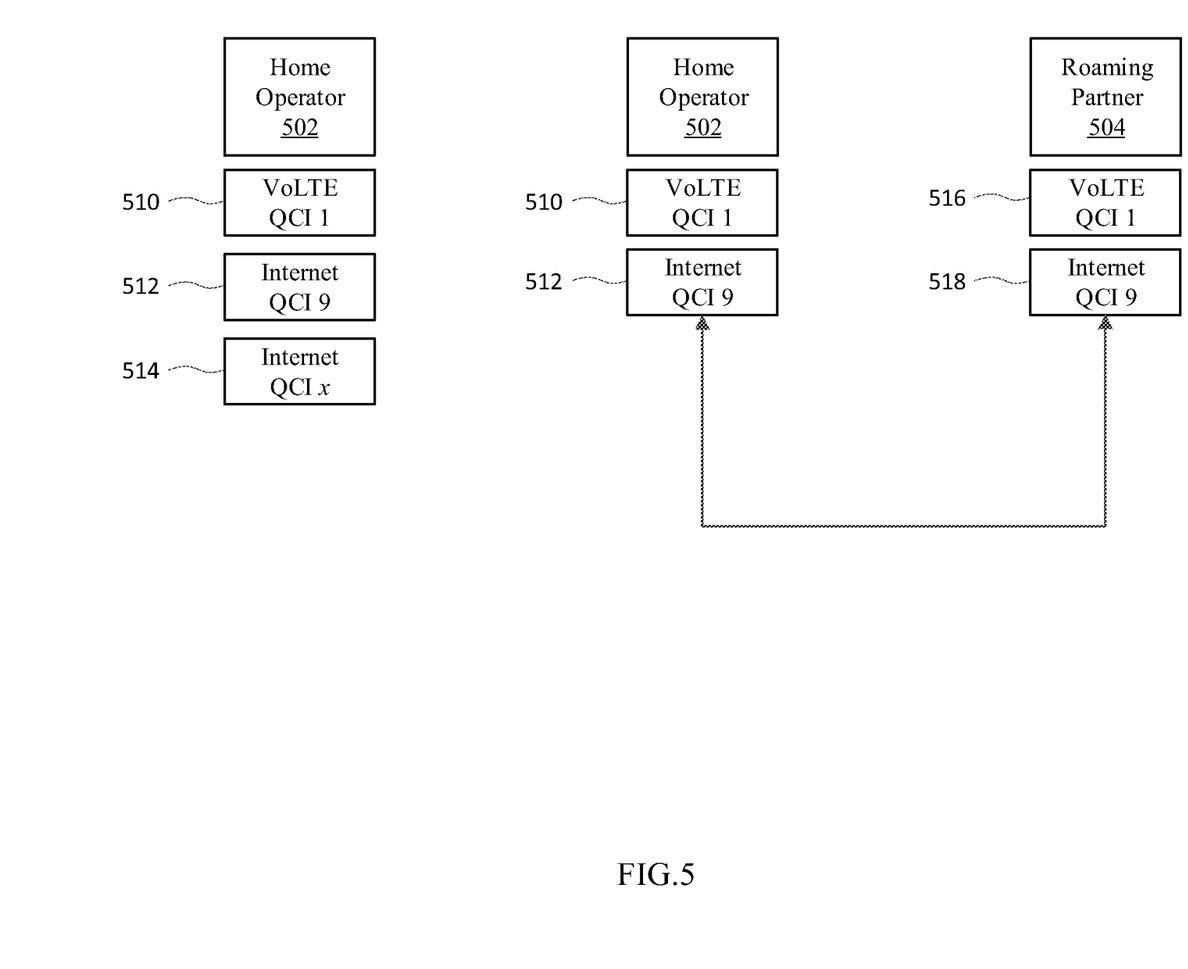
FIG. 5 is a diagram showing roaming interoperability for OTT calls, according to an embodiment.

FIG. 5 is a diagram showing roaming interoperability for OTT calls, according to an embodiment. In FIG. 5, OTT call routing policies as determined or implemented by the system (e.g., server 120) for OTT calls by a user equipment (e.g., device 110) are depicted. As shown, a network may include a home operator 502 site in a non-roaming area, a home operator 502 site in a roaming area, and a roaming partner 504 site (or touchpoint). The home operator 502 in the non-roaming area may include a QCI 510 for VOLTE, a QCI 512 for Internet, and other QCIs 514 for additional Internet connections or processing. The home operator 502 in the non-roaming area may include the QCI 510 for VOLTE and the QCI 512 for Internet. The roaming partner 504 may include a QCI 516 for VOLTE and a QCI 518 for Internet. For OTT calls initiated on the home operator 502 site with roaming touchpoints (i.e., the home operator 502 site in the middle of FIG. 5), the OTT calls are routed on the default bearer 512 pursuant to the policy determined by the system according to an embodiment. Accordingly, when the user equipment transitions to the roaming partner 504 site, the bearer is not rejected and the call can continue seamlessly. As opposed to previous methods where a core session is force released, an IP address is changed, and a fresh re-registration to the application server is required, the methods and systems disclosed herein provide interoperability where the core session is not forced to be released, the IP address remains the same, and no re-registration to the application server is needed.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for setting a policy for Over-The-Top (OTT) calls in a mobile network, the method comprising:
    determining whether a home operator site of the mobile network has a roaming touch point with at least one roaming partner of the mobile network;
    determining a bearer policy for routing OTT calls in the home operator site of the mobile network based on whether the home operator site of the mobile network is determined to have a roaming touch point with at least one roaming partner;
    obtaining a home operator policy for OTT calls; and
    based on the obtained home operator policy indicating that the OTT calls are to be routed on a dedicated bearer for connecting to an Internet Access Point Name (APN), and based on the home operator site of the mobile network having a roaming touch point with at least one roaming partner of the mobile network:
        obtaining a state of the dedicated bearer for the home operator site of the mobile network having a roaming touch point with at least one roaming partner; and
        based on the obtained state indicating that the dedicated bearer is enabled for routing OTT calls in the home operator site of the mobile network having a roaming touch point with at least one roaming partner, and based on OTT call routing behavior signaling on a default bearer, controlling to change the state of the dedicated bearer to be disabled for routing the OTT calls in the home operator site of the mobile network having a roaming touch point with at least one roaming partner, such that OTT calls are routed on the default bearer of the at least one roaming partner.

2. The method as claimed in claim 1, wherein the determining the bearer policy comprises:
    based on determining that the home operator site of the mobile network has no roaming touch points with any roaming partner, determining, as the bearer policy, a first bearer policy for routing the OTT calls for connecting to the Internet APN; and
    based on determining that the home operator site of the mobile network has a roaming touch point with at least one roaming partner, determining, as the bearer policy, a second bearer policy for routing the OTT calls for connecting to the Internet APN.

3. The method as claimed in claim 1, wherein the determining the bearer policy further comprises:
    based on the obtained home operator policy indicating that the OTT calls are to be routed on the default bearer for connecting to the Internet APN, determining the bearer policy for the OTT calls in the home operator site of the mobile network to be same as the home operator policy.

4. The method as claimed in claim 1, wherein the obtaining the home operator policy comprises obtaining the home operator policy from a policy and charging rules function (PCRF) that determines a Quality of Service (QOS) Class Indicator (QCI) to be established upon receiving an RX trigger from an application server corresponding to an OTT application, and a corresponding linked bearer corresponding to the QCI.

5. The method as claimed in claim 1, further comprising:
    storing information indicating, for each of plural cells of the mobile network, whether there are any roaming touch points with any roaming partner,
    wherein the determining whether the home operator site of the mobile network has a roaming touch point with the at least one roaming partner comprises determining whether the home operator site of the mobile network has a roaming touch point with at least one roaming partner based on the stored information.

6. The method as claimed in claim 5, further comprising updating the stored information at predetermined time intervals.

7. A system for setting a policy for Over-The-Top (OTT) calls in a mobile network, the system comprising:
    a memory storing instructions; and
    a processor configured to execute the instructions to:
        determine whether a home operator site of the mobile network has a roaming touch point with at least one roaming partner of the mobile network,
        determine a bearer policy for routing OTT calls in the home operator site of the mobile network based on whether the home operator site of the mobile network is determined to have a roaming touch point with at least one roaming partner,
obtain a home operator policy for OTT calls; and
based on the obtained home operator policy indicating that the OTT calls are to be routed on a dedicated bearer for connecting to an Internet Access Point Name (APN), and based on the home operator site of the mobile network having a roaming touch point with at least one roaming partner of the mobile network:
obtain a state of the dedicated bearer for the home operator site of the mobile network having a roaming touch point with at least one roaming partner; and
based on the obtained state indicating that the dedicated bearer is enabled for routing OTT calls in the home operator site of the mobile network having a roaming touch point with at least one roaming partner, and based on OTT call routing behavior signaling on a default bearer, change the state of the dedicated bearer to be disabled for routing the OTT calls in the home operator site of the mobile network having a roaming touch point with at least one roaming partner, such that OTT calls are routed on the default bearer of the at least one roaming partner.

8. The system as claimed in claim 7, wherein the processor is configured to execute the instructions to determine the bearer policy by:
based on determining that the home operator site of the mobile network has no roaming touch points with any roaming partner, determining, as the bearer policy, a first bearer policy for routing the OTT calls for connecting to the Internet APN; and
based on determining that the home operator site of the mobile network has a roaming touch point with at least one roaming partner, determining, as the bearer policy, a second bearer policy for routing the OTT calls for connecting to the Internet APN.

9. The system as claimed in claim 7, wherein the processor is configured to execute the instructions to determine the bearer policy further by:
based on the obtained home operator policy indicating that the OTT calls are to be routed on the default bearer for connecting to the Internet APN, determining the bearer policy for the OTT calls in the home operator site of the mobile network to be same as the home operator policy.

10. The system as claimed in claim 7, wherein the processor is configured to execute the instructions to obtain the home operator policy by obtaining the home operator policy from a policy and charging rules function (PCRF) that determines a Quality of Service (QOS) Class Indicator (QCI) to be established upon receiving an RX trigger from an application server corresponding to an OTT application, and a corresponding linked bearer corresponding to the QCI.

11. The system as claimed in claim 7, wherein the processor is further configured to execute the instructions to:
store information indicating, for each of plural cells of the mobile network, whether there are any roaming touch points with any roaming partner,
wherein the determining whether the home operator site of the mobile network has a roaming touch point with at least one roaming partner comprises determining whether the home operator site of the mobile network has a roaming touch point with at least one roaming partner based on the stored information.

12. The system as claimed in claim 11, wherein the processor is further configured to execute the instructions to update the stored information at predetermined time intervals.

13. A non-transitory computer-readable storage medium for setting a policy for Over-The-Top (OTT) calls in a mobile network, the storage medium connected to one or more processors and configured to store instructions that, when executed, cause the one or more processors to:
determine whether a home operator site of the mobile network has a roaming touch point with at least one roaming partner of the mobile network,
determine a bearer policy for routing OTT calls in the home operator site of the mobile network based on whether the home operator site of the mobile network is determined to have a roaming touch point with at least one roaming partner,
obtain a home operator policy for OTT calls, and
based on the obtained home operator policy indicating that the OTT calls are to be routed on a dedicated bearer for connecting to the internet APN:
obtain a state of the dedicated bearer for the home operator site of the mobile network having a roaming touch point with at least one roaming partner; and
based on the obtained state indicating that the dedicated bearer is enabled for routing OTT calls in the home operator site of the mobile network having a roaming touch point with at least one roaming partner, and based on OTT call routing behavior signaling on a default bearer, change the state of the dedicated bearer to be disabled for routing the OTT calls in the home operator site of the mobile network having a roaming touch point with at least one roaming partner, such that OTT calls are routed on the default bearer of the at least one roaming partner.

14. The storage medium of claim 13, wherein the instructions, when executed, cause the one or more processors to determine the bearer policy by:
based on determining that the home operator site of the mobile network has no roaming touch points with any roaming partner, determining, as the bearer policy, a first bearer policy for routing the OTT calls for connecting to the Internet APN; and
based on determining that the home operator site of the mobile network has a roaming touch point with the at least one roaming partner, determining, as the bearer policy, a second bearer policy for routing the OTT calls for connecting to the Internet APN.

15. The method of claim 1, further comprising, based on the home operator site of the mobile network being determined to have no roaming touch points with any roaming partner and the obtained state indicating that the dedicated bearer is not enabled for routing OTT calls in the home operator site of the mobile network, controlling to change the state of the dedicated bearer to be enabled for routing the OTT calls in the home operator site of the mobile network.

16. The system of claim 7, wherein the processor is further configured to execute the instructions to, based on the home operator site of the mobile network being determined to have no roaming touch points with any roaming partner and the obtained state indicating that the dedicated bearer is not enabled for routing OTT calls in the home operator site of the mobile network, change the state of the dedicated bearer to be enabled for routing the OTT calls in the home operator site of the mobile network.

17. The storage medium of claim 13, wherein the instructions, when executed, further cause the one or more processors to:
- based on the home operator site of the mobile network being determined to have no roaming touch points with any roaming partner and the obtained state indicating that the dedicated bearer is not enabled for routing OTT calls in the home operator site of the mobile network, change the state of the dedicated bearer to be enabled for routing the OTT calls in the home operator site of the mobile network.

* * * * *